United States Patent
Ribero

(10) Patent No.: US 11,912,127 B2
(45) Date of Patent: Feb. 27, 2024

(54) METHOD FOR CONTROLLING A VEHICLE

(71) Applicant: Volvo Truck Corporation, Gothenburg (SE)

(72) Inventor: Raphaël Ribero, Millery (FR)

(73) Assignee: Volvo Truck Corporation, Gothenburg (SE)

(*) Notice: Subject to any disclaimer, the term of this patent is extended or adjusted under 35 U.S.C. 154(b) by 479 days.

(21) Appl. No.: 16/960,826

(22) PCT Filed: Jan. 9, 2018

(86) PCT No.: PCT/IB2018/000131
§ 371 (c)(1),
(2) Date: Jul. 8, 2020

(87) PCT Pub. No.: WO2019/138262
PCT Pub. Date: Jul. 18, 2019

(65) Prior Publication Data
US 2020/0361490 A1  Nov. 19, 2020

(51) Int. Cl.
*B60K 28/14* (2006.01)
*B60W 60/00* (2020.01)
(Continued)

(52) U.S. Cl.
CPC ............ *B60K 28/14* (2013.01); *B60W 10/18* (2013.01); *B60W 10/30* (2013.01); *B60W 30/16* (2013.01);
(Continued)

(58) Field of Classification Search
CPC .. B60W 60/0016; B60W 10/18; B60W 10/30; B60W 30/16; B60W 2552/53;
(Continued)

(56) References Cited

U.S. PATENT DOCUMENTS 9,514,647 B2  12/2016  Moshchuk et al.
9,701,307 B1 *  7/2017  Newman .............. G05D 1/0214
(Continued)

FOREIGN PATENT DOCUMENTS

DE  102006059915 A1  7/2008
DE  102011108870 A1  4/2012
(Continued)

OTHER PUBLICATIONS

International Search Report and Written Opinion for International patent application No. PCT/IB2018/000131, dated Oct. 4, 2018, 8 pages.
(Continued)

*Primary Examiner* — Nadeem Odeh
(74) *Attorney, Agent, or Firm* — Withrow & Terranova, PLLC

(57) ABSTRACT

A method for controlling a vehicle moving on a road, wherein the vehicle includes a controller capable of activating an automated function involving emergency braking of the vehicle. The method includes automated steps consisting in after the automated function is complete, collecting information relative to the space in front of the vehicle; determining whether the space in front of the vehicle is sufficient to enable the vehicle to move forward; only if the space in front of the vehicle is sufficient, reaccelerating.

7 Claims, 3 Drawing Sheets

(51) Int. Cl.
  *B60W 10/18* (2012.01)
  *B60W 10/30* (2006.01)
  *B60W 30/16* (2020.01)
  *G08G 1/00* (2006.01)
  *B60W 30/17* (2020.01)

(52) U.S. Cl.
  CPC ........... *B60W 60/0016* (2020.02); *G08G 1/22* (2013.01); *B60W 30/17* (2013.01); *B60W 2552/53* (2020.02); *B60W 2554/80* (2020.02); *B60W 2554/802* (2020.02)

(58) Field of Classification Search
  CPC ....... B60W 2554/80; B60W 2030/082; B60W 2520/105; B60W 2554/00; B60W 30/09; B60W 30/17; B60W 2554/802; B60W 2554/801; B60W 10/04; B60W 10/184; B60K 28/14; G08G 1/22
  See application file for complete search history.

(56) References Cited

U.S. PATENT DOCUMENTS

| | | |
|---|---|---|
| 2008/0266052 A1 | 10/2008 | Schmid |
| 2010/0010723 A1* | 1/2010 | Taki ...................... B60W 30/08 701/102 |
| 2014/0207352 A1 | 7/2014 | Rossi et al. |
| 2016/0229397 A1* | 8/2016 | Muthukumar ........ B60R 21/013 |
| 2017/0001636 A1* | 1/2017 | Laur ...................... B60W 30/09 |
| 2017/0072950 A1* | 3/2017 | Sim ..................... B60W 10/184 |
| 2017/0106858 A1 | 4/2017 | Li et al. |
| 2017/0174212 A1* | 6/2017 | Gussen ................. B60W 50/10 |
| 2017/0259813 A1* | 9/2017 | Wokoeck .............. B60W 30/08 |
| 2018/0015918 A1* | 1/2018 | Bae ........................ B60W 10/20 |
| 2018/0354507 A1* | 12/2018 | Slattery .................... B60T 7/22 |
| 2019/0206260 A1* | 7/2019 | Pilkington ........... G05D 1/0295 |
| 2019/0241178 A1* | 8/2019 | Chikh ................... B60W 50/14 |
| 2020/0262421 A1* | 8/2020 | Ito ............................. F02D 29/02 |
| 2020/0361486 A1* | 11/2020 | Mielenz ............. B60W 30/146 |

FOREIGN PATENT DOCUMENTS

| | | |
|---|---|---|
| EP | 1703482 A1 | 9/2006 |
| WO | 2011069489 A1 | 6/2011 |

OTHER PUBLICATIONS

First Office Action for Chinese Patent Application No. 201880085988.2, dated Feb. 11, 2023, 16 pages.

* cited by examiner

METHOD FOR CONTROLLING A VEHICLE

This application is a 35 USC 371 national phase filing of International Application No. PCT/IB2018/000131, filed Jan. 9, 2018, the disclosure of which is incorporated herein by reference in its entirety.

The present invention concerns a method for controlling a vehicle.

In the automotive industry, modern vehicles now integrate a plurality of automated systems, such as Advanced Emergency Braking system (AEBS), Adaptive Cruise Control (ACC) system, queue assistance system, Stop and Go system, etc. Each one of these systems is part of a controller of the vehicle, and there is an associated automated function to each system.

In some situations, an automated function involves strong braking of the vehicle. This is for example the case of the AEBS function, whose purpose is to avoid or mitigate a collision with a front obstacle. Such function results in an automatic application of the brakes at the maximum effort. Strong braking may also occur in the other above-listed automated functions.

When a strong braking (or emergency braking) occurs, the automated function is usually aborted when the vehicle is at standstill and the driver has to take over to move the vehicle forward again. In practice, the driver circumvents the obstacle or moves forward again if there is no more obstacle. Indeed, when the obstacle is a crossing vehicle/pedestrian/animal, it opposes the passage of the vehicle only for a few seconds. When the obstacle is an upfront vehicle placed on the same lane, that upfront vehicle can sometimes accelerate again. The problem is that, taking into account the reaction time of the driver, the vehicle may rest at standstill on the lane for a few seconds, and there is a risk of collision with the vehicle(s) travelling behind, which may not have sufficient time or distance to slow down.

The objective of the invention is then to provide a new method for controlling a vehicle, which enables limiting the risk of collision with vehicle(s) travelling behind after a strong automatic braking has occurred.

With this respect, the invention concerns a method according to claim 1.

US 2016/229397 discloses a particular system that is capable of sensing that the vehicle is about to collide with a vehicle approaching from behind and of maneuvering the vehicle to use available space in front of the vehicle to increase the distance with the rear end vehicle. The system is also capable of sensing a collision with a front obstacle and of automatically braking the vehicle to avoid or mitigate such collision.

DE 10 2006 059915 A1 discloses a particular method to regulate the speed of a vehicle in a traffic situation, i.e. between a preceding vehicle and a following vehicle. This document discloses accelerating at a sufficient safety distance in front of the vehicle in order to avoid an accident with a following vehicle travelling at an excessively short distance and/or at a too high speed. This method is then an extension of the ACC function (which takes generally into account only the safety distance with preceding vehicle).

US 2017/106858 discloses a process wherein the preliminary step is to receive an information relative to the driver fatigue. Then, the vehicle speed is automatically increased or decreased, depending on the situation. For example, the vehicle may be automatically accelerated if the distance between the vehicle and another vehicle approaching from behind is inferior to a safety distance.

U.S. Pat. No. 9,514,647 discloses another control method, providing automatic braking or steering of a vehicle in order to avoid collision(s) with a preceding vehicle or a following vehicle. However, this document fails to disclose a step of automatically accelerating the vehicle to avoid a collision with a following vehicle.

The above-mentioned prior art documents teach that, on one side, it is known to automatically decelerate a vehicle to avoid a collision with a front obstacle and that, on the other side, it is known to automatically accelerate a vehicle when the safety distance with a following vehicle is too short. However, none of these prior art documents discloses the possibility of reaccelerating the vehicle just after a strong automatic braking action has occurred.

To the contrary, the method of the invention consists in reaccelerating automatically the vehicle after an automated function, involving strong braking, has occurred. Accordingly, the driver does not have to take over to move the vehicle forward, as it is automatically performed. There is then a gain of time of a few seconds, given that the reacceleration does not depend on the reaction time of the driver. Accordingly, the automatic reacceleration helps increasing the safety distance with the vehicle approaching from behind, and provides the vehicle(s) behind more time and/or distance to slow down. Obviously, the method works only if, after strong braking has occurred, there is sufficient space in front of the vehicle to move forward. The method then involves checking for available room (or space) in front of the vehicle.

Advantageous, but not compulsory features, of the method are defined in the claims 2 to 11.

The invention will be better understood from reading the following description, given solely by way of several non-limiting examples and with reference to the appended drawings, in which.

Figure 1:
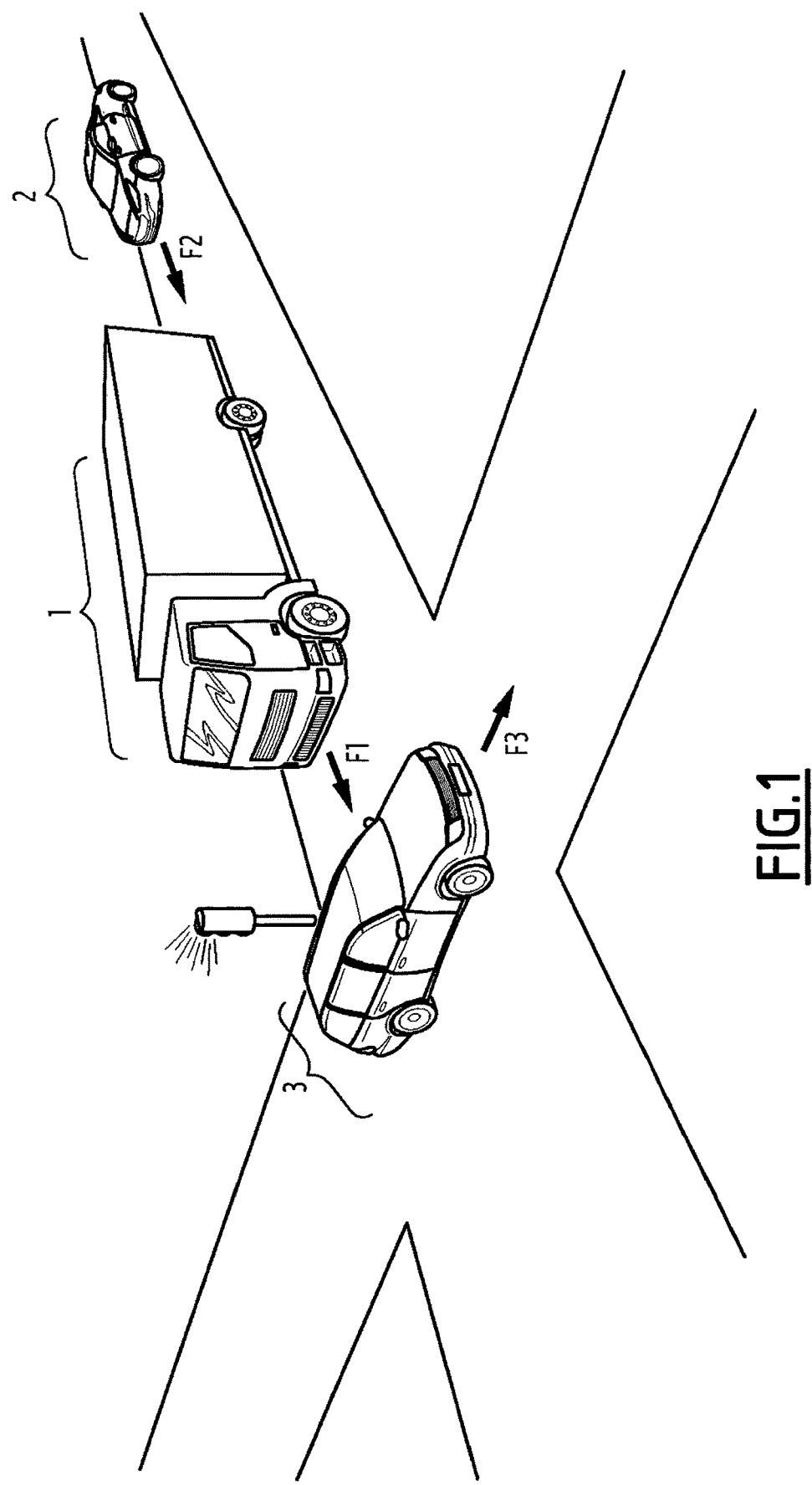
FIG. 1 represents a situation wherein an automated function is performed to apply strong braking.

FIG. 1 represents schematically a situation of potential collision between a vehicle 1 and an obstacle 3. In the example, the vehicle 1 is a truck moving on a straight road (See arrow F1). However, the invention is obviously applicable to any other type of vehicle. Also, the obstacle 3 is, for example, a crossing vehicle (See arrow F3), more precisely a vehicle having passed by a red light at an intersection. More generally, it can be any up front vehicle with an important speed gap with our current vehicle.

There is also another vehicle 2, approaching the truck 1 from behind (See arrow F2).

In the example, the truck 1 is a semi-autonomous vehicle, meaning that this vehicle cannot be driven without driver on board, but that the vehicle integrates one or more automated functions which, when they are activated (automatically) change the dynamic conditions of the vehicle (speed and/or trajectory). Obviously, the invention is also applicable when the vehicle is fully autonomous, i.e. when the vehicle can be driven without driver on board.

Typically, the truck 1 includes a controller (not represented) capable of activating an automated function, involving strong braking of the vehicle 1. In a preferred embodiment, said automated function is an advanced emergency braking function that is performed by an Advanced Emergency braking system integrated in the controller. However, in alternative embodiments, the invention is also applicable to any other automated function involving strong braking. In particular, other systems, such as the Adaptive Cruise Control systems, Queue assistance systems, Automotive distance control systems and Stop and go systems may involve strong braking when they are activated.

In the situation of FIG. 1, advanced emergency braking function is activated to avoid a collision with the vehicle 3 crossing the road in front of the vehicle 1, meaning that strong braking of the truck 1 automatically occurs.

Figure 2:
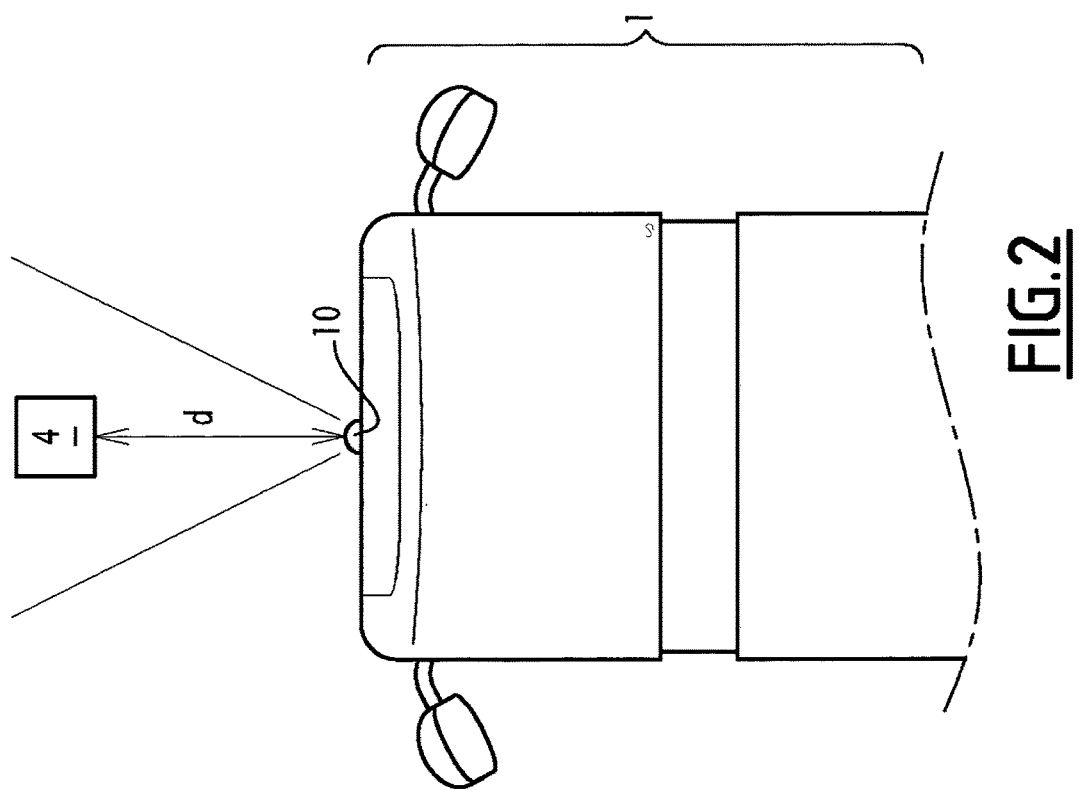
FIG. 2 represents a view from above after said automated function is complete.
Figure 4:
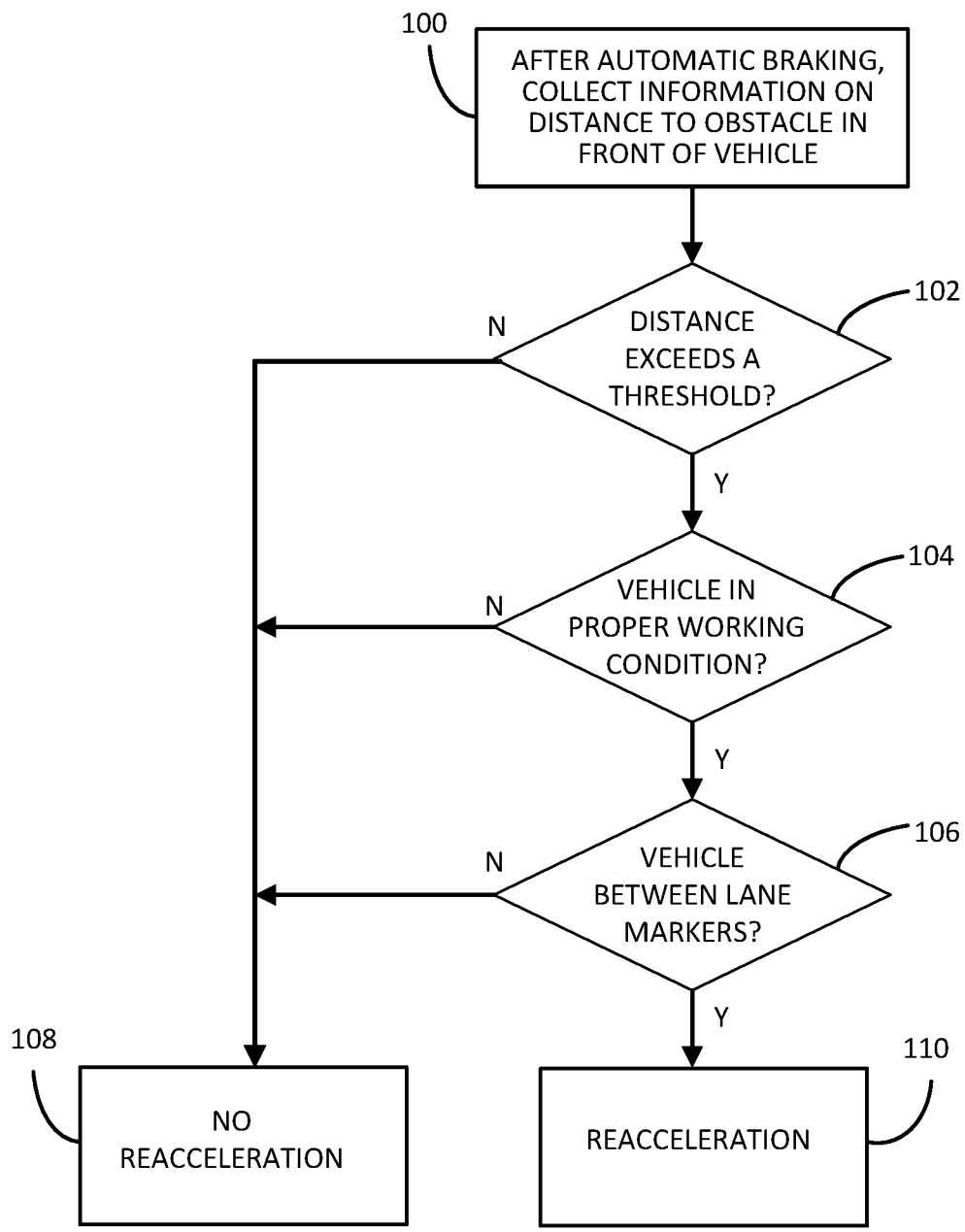
FIG. 4 is a diagram representing the main steps of the method according to the invention.

With respect to FIG. 4, the method of the invention then includes a first step 100 consisting in, after said automated function is complete, collecting information relative to the space in front of the vehicle 1. More precisely, this consists, as shown in FIG. 2, in measuring the distance d to the nearest obstacle 4 in front of the vehicle 1.

Typically, such information can be collected by a radar 10 or any other detection device arranged at the front (longitudinal) end of the vehicle and transmitted to the controller of the truck 1. Alternatively, the radar 10 may be replaced by an ultrasonic sensor, a laser sensor, a Lidar sensor, a camera or any sensor being able to give an indication about the distance with an upfront obstacle. The distance information can also be collected by any other vehicle to vehicle communication means giving the exact position of each and single vehicle in the surrounding, etc.

The radar 10 or any comparable measuring means, has a measurement field which extends in front of the vehicle, i.e. in the longitudinal direction of the vehicle. Advantageously, in the example, this measurement field is represented as a detection cone. Accordingly, the measurement field extends across the entire width of the vehicle, meaning that the measuring means is able to detect any obstacle in front of the vehicle 1.

The radar 10 (or any comparable measuring means in replacement) assesses the presence of obstacle(s) in the measurement field. It is then possible to determine which obstacle is the nearest one from the vehicle and at which distance is this obstacle from the vehicle 1.

Then, it is determined, at a step 102 whether the space in front of the vehicle 1 is sufficient to enable the vehicle 1 to move forward. More precisely, it is determined whether the distance d is sufficient to enable the vehicle 1 to reaccelerate.

In practice, the distance d to the nearest obstacle 4 in front of the vehicle 1 is considered as being sufficient to enable the vehicle 1 to reaccelerate if such distance d is superior to a threshold value, for example superior to 5 meters. Accordingly, step 102 consists in comparing the measured distance d with said threshold value.

Step 102 is performed by the controller of the truck itself, which preferably includes a processing unit capable of processing the information.

Afterwards, the method consists, at a step 110, in reaccelerating only if the space in front of the vehicle is sufficient, i.e. only if said distance d is sufficient. One then understands that the condition of having sufficient space in front of the vehicle is necessary for allowing the vehicle to move forward. This means that if the distance d is not sufficient to enable the vehicle 1 to reaccelerate, then there is no automatic reacceleration and the method is ended (Step 108).

Preferably, when the vehicle has decided to reaccelerate, the gap with the upfront vehicle can be closed to a tiny distance like a few dozens of cm (e.g. 30 cm).

Preferably, the method includes another step 104 prior to step 110, consisting in checking, after said automated function is complete, whether the vehicle is in proper working condition. Then, at step 110, the vehicle 1 is reaccelerated only if the vehicle is in proper working condition.

In practice, an electronic control unit (ECU) constantly receives measurements from at least one sensor, in particular from at least one accelerometer. This sensor is designed for measuring the acceleration (and deceleration) of the vehicle in the forward (longitudinal) direction.

A collision algorithm, integrated in the controller, includes a step of calculating one or more physical criteria. In particular, if the measured deceleration is higher than a specific threshold, then it is determined that the vehicle has been involved in an accident. Accordingly, the step of reacceleration is not computed. This kind of algorithm is known as such, as it is already implemented for triggering the activation of the air bags.

For example, when a collision has occurred, it may be determined that the vehicle is no more in proper condition to move forward again. More precisely, when the measured deceleration is higher than said specific threshold, a signal can be sent to the controller for informing the controller of an accident. Accordingly, there is no automatic reacceleration (Step 108). In this specific situation, the driver must regain control to move the vehicle forward again, provided that the vehicle is still in condition to move. If the truck has collided with the upfront vehicle, we do not execute the automatic reacceleration as it would be hard to monitor the basic vehicle functions availability (Acceleration, braking, direction, upfront distance calculation means etc. . . . ).

Figure 3:
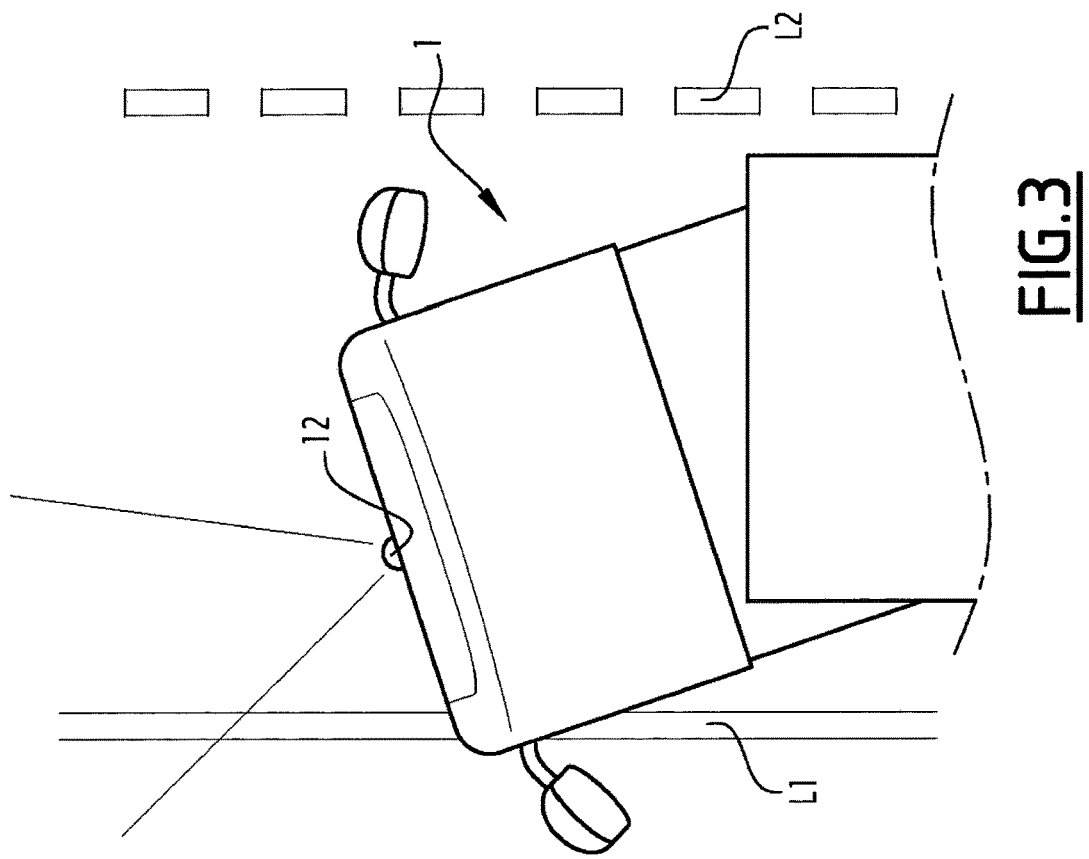
FIG. 3 represents another view from above after said automated function is complete, in a configuration other than that of FIG. 2.

Advantageously, and as represented on FIG. 3, the method includes another step 106 prior to step 110, consisting in checking, after said automated function is complete, whether the vehicle is between the lane markers L1 and L2 of the road. Then, at step c), the vehicle is reaccelerated only if the vehicle is still between the lane markers L1 and L2. Typically, and in known manner, a camera 12 may be mounted in the front (longitudinal) end of the vehicle to detect the lanes L1 and L2 of the road. The images captured by the camera 12 can then be processed to determine if the vehicle is between the lanes L1 and L2 or across the road. Obviously, if after the strong automatic braking, the vehicle 1 comes across the road (as in the configuration of FIG. 3), there is no reacceleration (Step 108).

Steps 100 to 110 are automated steps, i.e. steps that are executed by the vehicle controller. In other words, these steps are not manually executed by the driver or any other person.

In an alternative embodiment, the vehicle is capable of moving in a platooning mode wherein the vehicle moves with other vehicles within a platoon of vehicles and the method described above is implemented only when the vehicle is in platooning mode.

The features of the example and of non-represented alternative embodiments may be combined to generate new embodiments of the invention.

The invention claimed is:

1. A method for controlling a vehicle moving on a road, the method comprising:
   activating, by an electronic controller of the vehicle, an automated function involving emergency braking of the vehicle;
   after the automated function is complete, collecting, by the controller, information relative to presence of objects in a space in front of the vehicle;

determining, by the controller, from the collected information a distance to a nearest object in the space in front of the vehicle;

determining, by the controller, whether the distance to the nearest object exceeds a threshold value;

after the automated function is complete, determining, by the controller, if the vehicle is between lane markers of a lane of the road; and in response to determining the distance to the nearest object exceeds the threshold value, automatically reaccelerating the vehicle by the controller only when the vehicle is between the lane markers of the lane of the road.

2. The method of claim 1, wherein the automatically reaccelerating the vehicle by the controller further comprises determining the vehicle is in proper working condition.

3. The method of claim 2, wherein the determining the vehicle is in proper working condition further comprises:

electronically measuring deceleration of the vehicle during the emergency braking, electronically comparing the measured deceleration with a specific threshold, determining the vehicle is in proper working condition in response to determining the measured deceleration is below the specific threshold.

4. The method of claim 1, wherein the vehicle is an autonomous vehicle.

5. The method of claim 1, wherein the vehicle is a semi-autonomous vehicle.

6. The method of claim 1, wherein the vehicle is configured to move in a platooning mode wherein the vehicle moves with other vehicles within a platoon of vehicles.

7. The method of claim 1, wherein the automated function is performed by at least one of the following systems integrated in the controller:

an advanced emergency braking system,
an adaptive cruise control system,
a queue assistance system,
an automotive distance control system, or
a stop and go system.

\* \* \* \* \*